: 3,066,146
Patented Nov. 27, 1962

---

3,066,146
N-(2-BENZOTHIAZOLYLTHIO)MALEIMIDE
Elbert C. Ladd, Passaic, N.J., assignor to United States Rubber Company, New York, N.Y., a corporation of New Jersey
No Drawing. Filed Sept. 6, 1961, Ser. No. 136,167
1 Claim. (Cl. 260—306.6)

This invention relates to a new chemical, denoted N-(2-benzothiazolylthio)maleimide, and is represented by the formula:

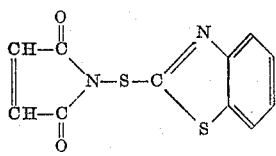

It is prepared by reacting 2-benzothiazolesulfenyl chloride with N-sodiomaleimde (sodium maleimide).

The subject compound, N-(2-benzothiazolylthio)-maleimide, is useful as a vulcanizing agent for highly unsaturated rubbers, particularly SBR rubber.

According to the invention, the subject compound may be prepared by the interaction of 2-benzothiazolesulfenyl chloride with N-sodiomaleimide. The reaction may be illustrated as follows:

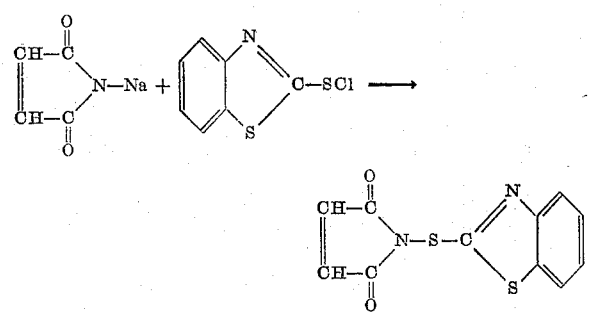

The following examples disclose the invention in more detail.

*Example I*

This example demonstrates the preparation of N-(2-benzothiazolylthio)maleimide. To a stirred slurry of 72 grams (0.2 mole) of recrystallized 2,2'-dithiobisbenzothiazole in 500 ml. of dry 1,2-dichloroethane was added 15.6 grams (0.22 mole) of chlorine gas, with stirring, to form 2-benzothiazolesulfenyl chloride. After a short period of time, 60 grams (0.5 mole) of sodium maleimide was added at 5° C. The temperature of the reaction mixture was allowed to rise to 25° C. and stirring was continued for 6 hours. Unreacted 2,2'-dithiobisbenzothiazole was filtered off and the filtrate concentrated to yield 67 grams of product melting at 100°–105° C. Recrystallization from a 50/50 (by volume) mixture of benzene and cyclohexane resulted in 38 grams of a yellow crystalline product having a melting point of 112°–113° C., this being N-(2-benzothiazolylthio)maleimide.

Analysis for $C_{11}H_6N_2S_2O_2$:

|  | Calculated | Found |
|---|---|---|
| Percent Nitrogen | 10.70 | 10.18 |
| Percent Sulfur | 24.5 | 27.1 |

*Example II*

This example demonstrates the use of N-(2-benzothiazolylthio)maleimide as a vulcanizing agent for SBR rubber. A styrene-butadiene copolymer rubber with a styrene content of about 20 percent (SBR–1500) was compounded with 50 parts by weight, per hundred of rubber, of a high abrasion furnace black (marketed under the registered trademark Philblack O by the Phillips Chemical Co.); 7.5 parts by weight of Circosol 2XH,[1] a naphthenic type petroleum oil (Sun Oil Co.); and 5.25 parts by weight of N-(2-benzothiazolylthio)maleimide. By way of comparison, a similar sample was prepared by replacing the chemical of my invention with N-phenylmaleimide, a known vulcanizing agent, on an equimolar basis, plus a thiazole accelerator. Compounding was done in the conventional manner. The rubber, black and oil were assembled and mixed in the Banbury for 10 minutes. Discharge temperature was 275°–300° F. The vulcanizing agent was added on a cool two-roll mill. Samples were cured in a press at 320° F. for the several times shown below, and tested by the conventional testing methods used for rubber.

| Stock | Parts by Weight | |
|---|---|---|
|  | A | B |
| SBR–1500 | 100 | 100 |
| Philblack O | 50 | 50 |
| Circosol 2XH | 7.5 | 7.5 |
| N-(2-benzothiazolylthio)maleimide (0.02 mole) | 5.25 |  |
| N-phenylmaleimide (0.02 mole) |  | 3.5 |
| 2,2'-dithiobisbenzothiazole |  | 1.7 |

The following table shows the results of tests on the cured samples.

| Physical Properties | Time of Cure (Minutes) | A | B |
|---|---|---|---|
| Tensile Strength (p.s.i.) | 10 | 1,475 | 1,385 |
|  | 20 | 1,810 | 1,620 |
|  | 30 | 1,760 | 1,310 |
| Elongation at Break (percent) | 10 | 430 | 340 |
|  | 20 | 390 | 345 |
|  | 30 | 365 | 300 |
| Modulus at 300% (p.s.i.) | 10 | 825 | 1,025 |
|  | 20 | 1,200 | 1,300 |
|  | 30 | 1,400 | 1,300 |

The above data illustrate the efficacy of N-(2-benzothiazolylthio)maleimide as a vulcanizing agent for SBR rubber. It should be noted that the subject compound does not require the addition of accelerators, such as a thiazole or peroxide-type accelerator, in producing rubber vulcanizates having outstanding physical properties.

Having thus described my invention, what I claim and desire to protect by Letters Patent is:

N-(2-benzothiazolylthio)maleimide.

References Cited in the file of this patent

Chem. Abstracts, vol. 50, col. 16782 (1956).

---

[1] Circosol 2XH: a mixture of comparatively high molecular weight hydrocarbons, sp. gr., 0.9465; analine point, 175° F.